US007685124B2

(12) United States Patent
Klein (10) Patent No.: US 7,685,124 B2
(45) Date of Patent: Mar. 23, 2010

(54) SYSTEMS AND METHODS FOR PERFORMING AUTHORIZATION

(75) Inventor: Udo Klein, Maximiliansau (DE)

(73) Assignee: SAP AG, Walldorf (DE)

( * ) Notice: Subject to any disclaimer, the term of this patent is extended or adjusted under 35 U.S.C. 154(b) by 220 days.

(21) Appl. No.: 11/589,259

(22) Filed: Oct. 30, 2006

(65) Prior Publication Data

US 2007/0100832 A1  May 3, 2007

(30) Foreign Application Priority Data

Oct. 31, 2005  (EP) ................................. 05110194

(51) Int. Cl.
*G06F 7/00* (2006.01)
*G06F 17/00* (2006.01)
*G06F 17/30* (2006.01)

(52) U.S. Cl. ........................................ 707/9; 707/104.1
(58) Field of Classification Search .................. None
See application file for complete search history.

(56) References Cited

U.S. PATENT DOCUMENTS

| 5,129,082 | A  | * | 7/1992  | Tirfing et al. ................... 707/3 |
| 6,154,728 | A  | * | 11/2000 | Sattar et al. .................... 705/28 |
| 6,898,603 | B1 | * | 5/2005  | Petculescu et al. .......... 707/101 |
| 2002/0099773 | A1 | * | 7/2002 | Tsuru .......................... 709/204 |
| 2004/0117371 | A1 | * | 6/2004 | Bhide et al. .................... 707/9 |
| 2004/0187006 | A1 | * | 9/2004 | Trapp .......................... 713/176 |

FOREIGN PATENT DOCUMENTS

CA  2 279 119 A1  1/2001

EP  1 536 309 A1  6/2005

OTHER PUBLICATIONS

Oh et al., "A Model for Role Administration Using Organization Structure," 2002, ACM, pp. 155-162.*
Lam et al., "Maintaining Temporal Consistency of Discrete Objects in Soft Real-Time Database Systems," 2001, IEEE, pp. 373-389.*
Schenk, Eric, "Parallel Dynamic Lowest Common Ancestors," Springer Berlin / Heidelberg, 1994.*

(Continued)

*Primary Examiner*—Pierre M Vital
*Assistant Examiner*—Rachel J Lee
(74) *Attorney, Agent, or Firm*—Finnegan, Henderson, Farabow, Garrett & Dunner LLP (57) ABSTRACT

Systems, methods, and computer program products are provided for performing an authorization check for a user. In one implementation, a data processing system is provided that includes means for storing first data descriptive of at least one directed acyclic graph and for storing second data descriptive of an assignment of a user to a first node of the graph. The data processing system also includes means for receiving an access request of the user, the access request specifying a second node of the graph. Furthermore, the data processing system includes means for determining a least common ancestor of the first and second nodes of the graph and means for performing an authorization check adapted to grant authorization for the access request if the least common ancestor of the first and second nodes is the first node.

15 Claims, 6 Drawing Sheets

OTHER PUBLICATIONS

SAP Authorization System—Design and Implementation of Authorization concepts for SAP R/3 and SAP Enterprise Portals, IBM Business Consulting GmbH, SAP Press, Chapter 2.3.5, pp. 5-10, 52-53 (9 pages) (Sep. 16, 2003).

Extended European Search Report issued by the European Patent Office in European Application No. EP 05 11 0194 dated Sep. 29, 2006 (11 pages).

Partial European Search Report issued by the European Patent Office in European Application No. EP 05 11 0194 dated Feb. 21, 2006 (4 pages).

Praveen K. Murthy et al., "Shared Buffer Implementations of Signal Processing Systems Using Lifetime Analysis Techniques," *IEEE Transactions on Computer-Aided Design of Integrated Circuits and Systems*, vol. 20, No. 2, pp. 177-198 (Feb. 2001).

Dov Harel et al., "Fast Algorithms for Finding Nearest Common Ancestors," *SAIM Journal on Computer*, vol. 13, No. 2, pp. 338-355 (May 1984).

Tzonelih Hwang et al., "Yet Another Efficient Access Control for User Hierarchy," *Security Technology, 1995, Proceedings, Institute of Electrical and Electronics Engineers 29$^{th}$ Annual 1995 International Camahan Conference on Sanderstead*, UK, pp. 496-501 (Oct. 18, 1995).

Michael A. Bender et al., "Finding Least Common Ancestors in Directed Acyclic Graphs," *in Latin American Theoretical Informatics*, pp. 845-854 (2001).

Michael A. Bender et al., "The LCA Problem Revisited," Lecture Notes in Computer Science, Springer Verlag, New York, NY, vol. 1776 (Apr. 2000), X90090/1369, pp. 88-94.

R. Cole et al., "Dynamic LCA Queries on Trees," SAIM J. Comput., vol. 34, No. 4, pp. 894-923 (May 12, 2005).

Sattler K-U et al., "Autonomous Query-Driven Index Tuning," Database Engineering and Applications Symposium, 2004, Ideas '04, Proceedings International Coimbra, Portugal, 10 pages (Jul. 7-9, 2004).

\* cited by examiner

SYSTEMS AND METHODS FOR PERFORMING AUTHORIZATION

TECHNICAL FIELD

The present invention generally relates to the field of data processing. More particularly, and without limitation, the invention relates to data processing in the field of user authorization.

BACKGROUND INFORMATION

A user's right to read and write specific data objects stored in a data processing system may be specified in his or her user profile. Manual maintenance of such user profiles is a tedious and error prone task. For example, if an organizational structure of a company changes, the respective user authorizations also need to be changed. This may require a manual update of a large number of user profiles that are afflicted by the organizational change.

Structural user authorization is a concept that aims to reduce this drawback. For example, SAP's authorization system as implemented in SAP R/3 (commercially available from SAP AG, Walldorf, Germany) has a structural authorization concept, as described in SAP Authorization System—Design and Implementation of Authorization concepts for SAP R/3 and SAP Enterprise Portals, IBM Business Consulting GmbH, SAP Press (see Chapter 2.3.5, page 52).

SUMMARY

In accordance with embodiments of the present invention, data processing systems may be provided that include means for storing first data descriptive of at least one directed acyclic graph and for storing second data descriptive of an assignment of a user to a first node of the graph. The data processing systems may also include means for receiving an access request of the user, the access request specifying a second node of the graph. Furthermore, the data processing systems may include means for determining a least common ancestor of the first and second nodes of the graph, and means for performing an authorization check to grant authorization for the access request if the least common ancestor of the first and second nodes is the first node.

In one embodiment consistent with the invention, the nodes of the graph may be assigned to data objects. The access request of the user may explicitly specify the second node. Alternatively or in addition, the access request may implicitly specify the second node by indicating the data object to which access is requested.

For example, assume that the data objects are confidential. Read and/or write access to these data objects may be controlled by performing an authorization check for the respective user access request. In this manner, unauthorized access to confidential information may be prevented and access to such confidential information may only be granted to users that have the required access rights, as specified by the assignment of the users to first nodes in the graph.

The determination of the least common ancestor of the first and second nodes in the graph may be performed using any known algorithm for finding such ancestors. One example of such an algorithm is disclosed by Dov Harel and Robert Endre Tarjan in "Fast Algorithms for Finding Nearest Common Ancestors," SIAM Journal on Computing, v.13 n.2, pp. 338-355, May 1984.

An algorithm that reduces the least common ancestor problem to the range minimum query problem may be used for determining the least common ancestor. An example of such an algorithm is described in M. A. Bender and M. Farach-Colton, "The LCA problem revisited," Latin American Theoretical Informatics, pp. 88-94, Apr. 2000. For example, the sparse table algorithm for the range minimum query problem, described in the Bender, Farach-Colton reference, may be used for determining the least common ancestor of the first and second nodes. The above-noted Harl, Tarjan and Bender, Farach-Colton references are expressly incorporated herein by reference to their entireties.

In accordance with an embodiment of the invention, a least common ancestor (LCA) index may be pre-computed, such as in the form of one or more tables or a sparse table (e.g., using one of the algorithms disclosed in the Bender, Farach-Colton reference). In accordance with another embodiment of the invention, the pre-computed LCA index may be stored in shared memory in order to enable parallel processing of authorization checks for multiple access requests received from various users. When users send access requests at a high frequency, such as when the data processing system is used in a large organization or corporation, storage of the LCA index in shared memory, such as in an application server computer, can provide short latency times to users for the performance of the authorization check.

In accordance with an embodiment of the invention, the graph may be a tree and the nodes of the tree may represent organizational entities. For example, the root node of the tree may represent a company holding various subsidiaries and affiliated companies that are represented by lower level nodes of the tree. Each subsidiary or affiliated company may have various business units that are also represented by nodes of the tree. The business units may have various departments whereby each department is represented by a node of the tree. In other words, all organizational entities of a complex company holding structure may be represented by respective nodes of the tree.

The level of granularity of the tree may depend on the required level of granularity of the access control. For example, the tree may go down to the individual employee level to represent each individual employee by a node in the tree. This can be required if, for example, personnel records of the employees are of a confidential nature and, therefore, need to be access-protected.

In accordance with another embodiment of the invention, the tree may represent organizational entities but not individuals, thus preventing frequent updates of the tree. Although the organizational structure of a company may be changed infrequently, the job positions of individual employees may change more frequently due to promotions within the company, employee fluctuation, and employee attrition. If access control needs to be provided on an individual employee level, each employee may be assigned to a node of the tree that represents the organizational entity to which the employee currently belongs. If the employee changes his job position, but the organizational structure of the company remains unchanged, then the employee's assignment to one of the nodes of the tree may be updated, but the tree may remain unchanged. In this manner, the LCA index for the tree may not need to be re-computed.

In additional embodiments consistent with the invention, methods are provided for performing an authorization check for a user. The user may be assigned to a first node of a directed acyclic graph, and the methods may include receiving an access request from the user, the access request specifying a second node of the graph. Further, such methods may include determining a least common ancestor of the first and second nodes and granting authorization if the least common ancestor of the first and second nodes is the first node.

In accordance with an embodiment of the invention, the least common ancestor of the first and second nodes may be determined using a pre-computed LCA index. By using a pre-computed LCA index, latency times experienced by users for the performance of an authorization check may be reduced. In accordance with an embodiment of the invention, the pre-computation of the LCA index may be initialized in response to an access request if no previously pre-computed LCA index exists in shared memory or if the available LCA index is older than a predefined time limit.

In accordance with an embodiment of the invention, pre-computation of a new LCA index may be initiated if the tree has been updated after a preceding pre-computation of the newest available LCA index.

In accordance with an embodiment of the invention, each LCA index stored in shared memory may have one of a first, second, third, or fourth status. The first status may indicate that the LCA index can currently be used for determining least common ancestors of first and second nodes for the performance of respective authorization checks. The second status may indicate that the LCA index is "outdated." An outdated LCA index may include a timestamp that indicates when the LCA index was put in the second "outdated" status. The outdated LCA index may be used for performing authorization checks if, for example, no current LCA index is available and if the outdated LCA index is not to old (e.g., if it is not older than a predefined first time interval). An exemplary first time interval is between five and fifteen minutes, such as ten minutes.

An LCA index may transition from the first to the second status if a pre-computation of the LCA index is initialized. The "outdated" LCA index may be used during the pre-computation for the performance of the authorization checks during the first time interval.

If neither a LCA index having the first status nor a LCA index having the second status is available, pre-computation of a new LCA index may be initiated asynchronously. The initialization of the pre-computation of the new LCA index may be performed by generating an instance of the LCA index that is initially empty. The instance of the LCA index may have a third status "wait." During the third status the pre-computation may be delayed for a second time interval. The second time interval may be shorter than the first time interval. For example, the length of the second time interval may be approximately 10% to 30% of the first time interval.

The status of the instance may transition from the third status to a fourth status after the second time interval has lapsed. The fourth status may indicate that the pre-computation of the LCA index is "in progress."

If there is neither an LCA index having the first status nor an LCA index having the second status, the authorization check may be performed without an LCA index using another technique, such as upwards traversal of the tree. In this manner, the latency time may be reduced when a LCA index does not exist or when the LCA index is not sufficiently up-to-date because the authorization check can be executed using an alternative algorithm, without having to wait until completion of the LCA index calculation.

In accordance with an embodiment of the invention, the second time interval of the instance having the third status may be incremented when a request for LCA pre-computation is made while the instance is still in its third status. This may increase the likelihood that all changes to the tree have been entered before the pre-computation of the LCA index starts. In this example, an additional instance for the LCA pre-computation may not be generated. For example, the second time interval may be incremented by restarting the second time interval or by adding an incremental time interval, such as one to three minutes.

In accordance with an embodiment of the invention, the status transition from the first status to the second status of the LCA index may be executed upon making a request for LCA pre-computation. The current LCA index that has the first status may be time stamped and placed in the second "outdated" status for temporary use during the first time interval while calculating the new LCA index.

In accordance with another embodiment of the invention, an instance of the LCA index that has the fourth status may be deleted upon receipt of a request for the LCA pre-computation while the instance is still in its fourth status, e.g., while computing the LCA index. The LCA index computation may be aborted due to the renewed LCA pre-computation request and the LCA pre-computation may be initiated again on the basis of the modified tree information.

Embodiments of the present invention may reduce the time and effort required for updating user profile information regarding user authorizations while minimizing the processing load for performing authorization checks. Further, authorization checks may be performed on the basis of relatively up-to-date tree information whereby the acceptable time interval during which an outdated LCA index can still be used may be selectable.

In still other embodiments consistent with the invention, computer program products may be provided for performing methods consistent with the present invention. The computer program products may be executed by an application server that generates the LCA indices on the basis of tree information stored in a database server.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
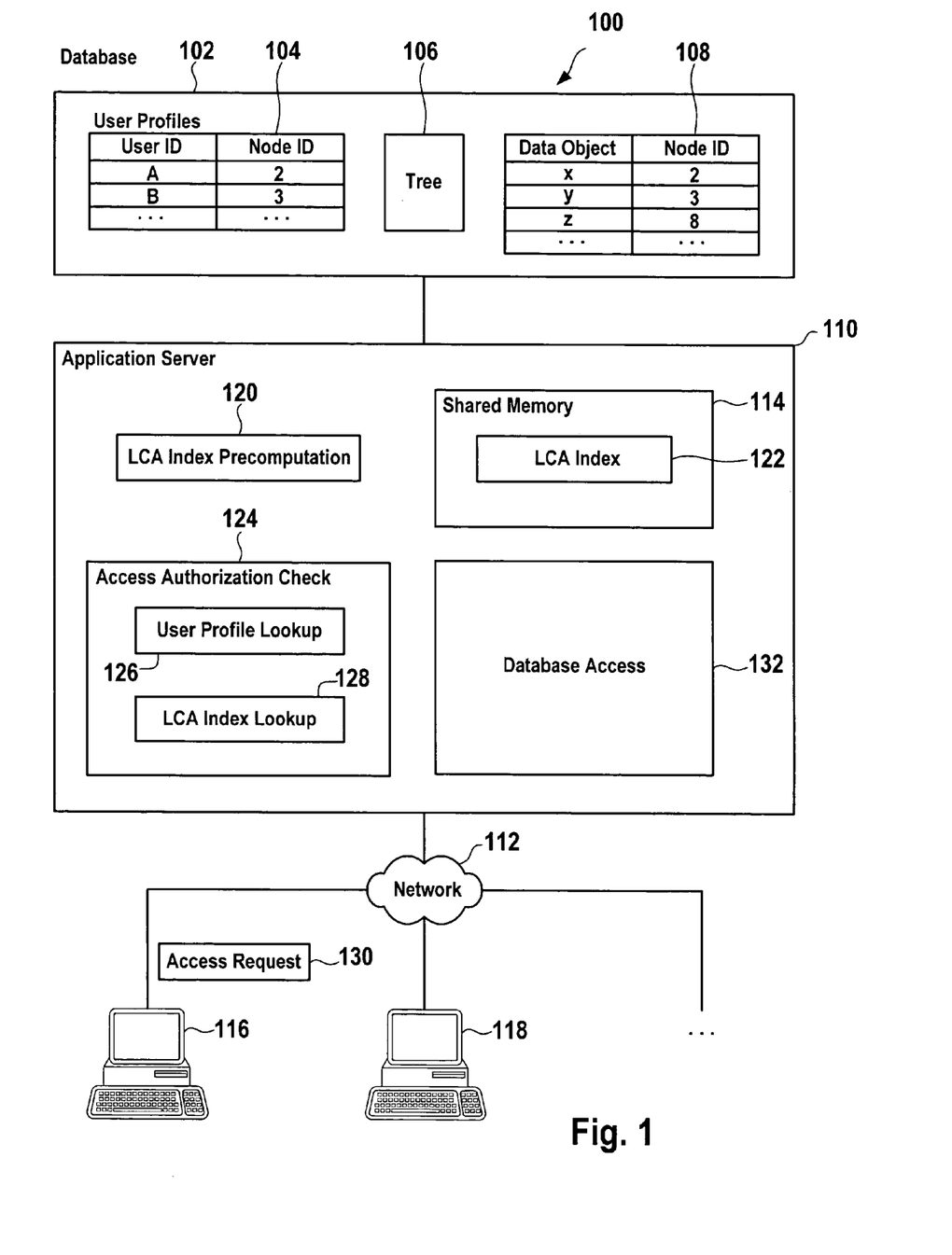
FIG. 1 illustrates, consistent with an embodiment of the invention, a block diagram of an exemplary data processing system.

FIG. 1 illustrates an exemplary data processing system 100. Data processing system 100 may include at least one database server 102 for storing user profiles 104, one or more database tables 106 for storing data descriptive of the nodes and vertices of at least one directed acyclic graph, such as a tree, and data objects 108, such as data files or other data structures.

Each node of the tree may be identified by a node identifier (ID) in database table 106. User profiles 104 may reference these node IDs. For example, the user having user identifier (ID) "A" may be assigned to node ID "2", whereas the user having user ID "B" may be assigned to the node having node ID "3", etc. The assignment of users to nodes of the tree may specify authorization levels of the users. A single assignment of a node ID per tree may be sufficient to specify a user's authorization level.

Data objects 108 may also reference node IDs of the tree. A user that is assigned to a specific node of the tree may be allowed access to all data objects that are assigned to that node and all data objects assigned to lower tree nodes below the node specified for that user.

An application server 110 may be coupled to the database server 102. Application server 110 and database server 102 may be closely or loosely coupled via the network 112.

Application server 110 may include a shared memory 114 for multiple client computers 116, 118, . . . , that may be coupled to application server 110 by network 112. Application server 110 may execute program instructions 120 for pre-computation of an LCA index 122. Pre-computed LCA index 122 may be stored in shared memory 114.

The LCA index pre-computation may be performed by any suitable LCA index pre-computation algorithm. For example, the LCA index may be calculated as one or more look up tables or a sparse table in accordance with one or more of the algorithms disclosed in the above-cited Bender, Farach-Colton reference. Application server 110 may access the required tree information stored in the database table 106 for the pre-computation of the LCA index.

Further, application server 110 may include program instructions 124 for performing an access authorization check. Program instructions 124 may be configured to read user profile information from user profiles 104, using, for example, the node ID that is assigned to a given user. Program instructions 124 may also perform a LCA Index Lookup 128 of the LCA index 122 using the node ID obtained from the user profiles 104 and the node ID of another node of the tree that is specified in an access request 130 received from a client computer 116, 118. Application server 110 may also include program instructions for performing database access operations 132 for reading data from database server 102.

In operation, application server 110 may execute program instructions 120 for computation of LCA index 122, which may be stored in shared memory 114. Program instructions 120 may be invoked automatically, such as by instructions 132, if a modification of the tree is entered into the database table 106.

Assume, without restriction, that user A logs onto client computer 116 and that user B logs onto client computer 118. An access request 130 initiated by user A may identify user A and a data object to which user A requests read and/or write access. The specification of the data object may be explicit, such as by including access path information to that data object in the access request 130. Alternatively, or in addition, access request 130 may indicate the node ID to which the data object of interest is assigned.

Receipt of access request 130 by application server 110 may invoke execution of program instructions 124. Program instructions 126 may perform a lookup operation of user profiles 104 to read the node ID that is assigned to the user ID in the access request 130. If the access request 130 does not directly specify a node ID of the tree to which access is requested, but rather specifies one of the data objects 108, the node ID that is assigned to that data object 108 may also be read from database server 102.

Next, program instructions 128 may be invoked to lookup the LCA index 122 using the node ID assigned to the user ID specified in the access request 130. Program instructions 128 may also lookup the node ID assigned to data object 108 to which access is requested. Authorization may be granted for the access request 130 if the least common ancestor of the node that is assigned to the specified user and the node that is assigned to data object 108 of interest is the node that is assigned to the specified user. Accordingly, the requested read and/or write access operation may executed by program instructions 132. However, if the contrary is the case, access request 130 may be rejected.

Figure 2:
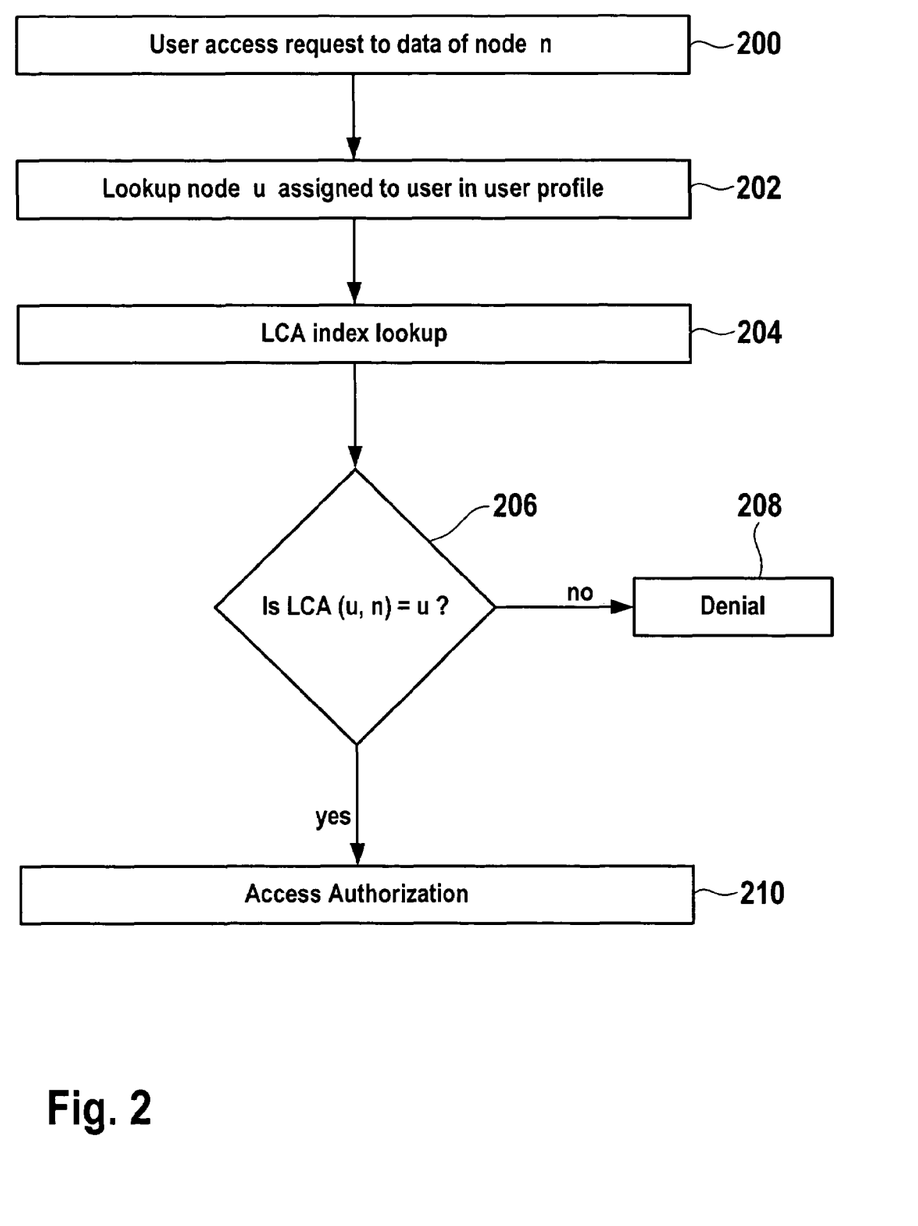
FIG. 2 illustrates, consistent with an embodiment of the invention, a flowchart of an exemplary method.

FIG. 2 illustrates, consistent with an embodiment of the invention, a flowchart illustrating an exemplary method. In step 200, an access request may be received from one of the users. The access request may directly or indirectly specify the node n of a tree to which the data of interest is assigned. In step 202, node u, to which the requesting user is assigned, may be looked up from the user profile of that user. Node u may specify the user's level of access authorization.

In step 204, an LCA index look up may be performed for nodes n and u. The table entries obtained for the nodes n and u from the LCA index may be evaluated in step 206 to determine whether the least common ancestor of nodes u and n is node u. If not, access may be denied (step 208). If this condition is fulfilled, access may be authorized (step 210).

Figure 3:
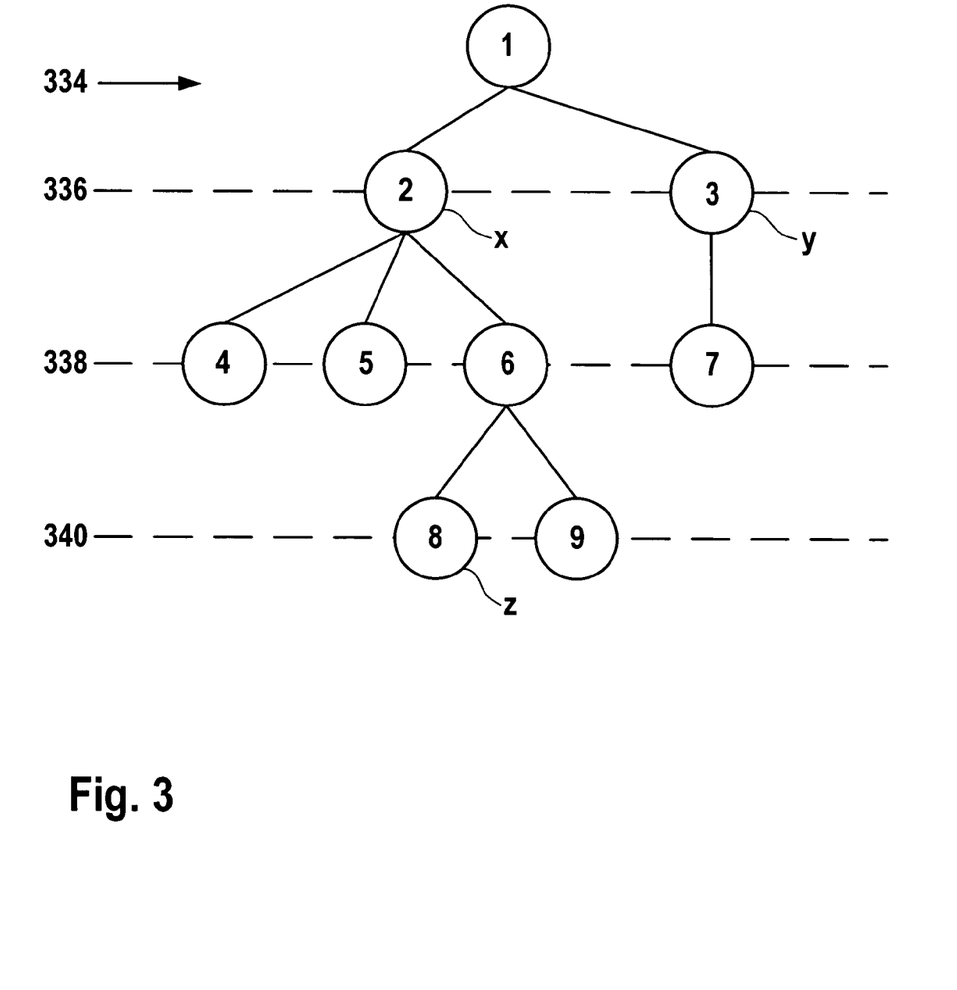
FIG. 3 illustrates, consistent with an embodiment of the invention, an exemplary tree structure.

FIG. 3 illustrates, consistent with an embodiment of the invention, an exemplary tree 334. Tree 334 has a root with node ID "1" and three tree levels 336, 338, and 340. Tree level 336 has child nodes 2 and 3 of root node 1. Tree level 338 has child nodes 4, 5, and 6 of node 2 and child node 7 of node 3. Tree level 340 has child nodes 8 and 9 of node 6.

In the exemplary user profile 104 of FIG. 1, user A is assigned to node 2. Accordingly, user A may have access rights to data objects assigned to node 2 and all nodes below node 2, i.e., nodes that are connected to node 2 and that are on lower tree levels 338 and 340. With reference to FIG. 3, these nodes are nodes 4, 5, 6, 8, and 9. Likewise, node 3 is assigned to user B such that user B has access rights to data objects assigned to node 3 and nodes below node 3, i.e., node 7.

For example, user A has access rights to the data object x that is assigned to node 2. User A also has access rights to data object z (assigned to node 8) because node 8 is on a lower tree level, i.e., tree level 340 and because there is a tree path from node 2 to node 8. However, user A does not have access rights to data object y as this is assigned to node 3 and node 3 is on the same tree level 336 as node 2. In other words, the least common ancestor of nodes 2 and 3 is node 1 rather than node 2. Therefore, the condition is not fulfilled and no access can be granted to user A for access to data object y.

Figure 4:
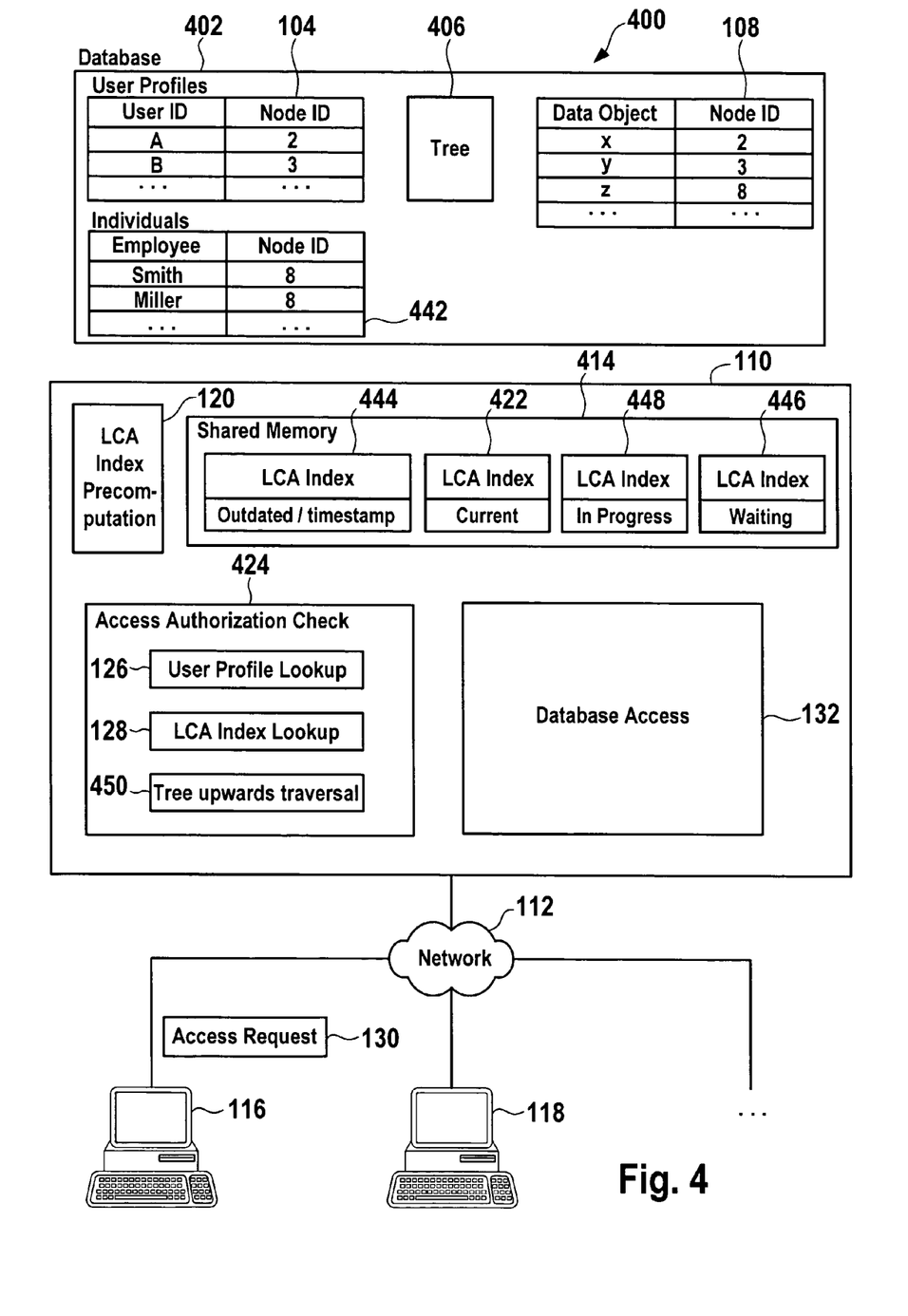
FIG. 4 illustrates, consistent with an embodiment of the invention, a block diagram of another exemplary data processing system.

FIG. 4 illustrates, consistent with embodiments of the invention, a block diagram of another exemplary data processing system 400. Database server 402 may include a mapping table 442 that maps individuals, such as employees, to nodes of the tree, e.g., tree 334, as stored in database table 406. In this embodiment, tree 334 does not need to go down to the employee level; rather, tree 334 may only cover the organizational structure of the company, including all organizational entities except individual employees and/or individual jobs of an organizational entity. In this manner, pre-computed LCA index 422 does not need to be re-computed each time an employee fluctuation occurs and/or if new jobs are defined or abolished within one of the organizational entities modelled by tree 334. Because changes in the organizational structure of a company may occur relatively infrequently, respective recalculations of the LCA index 422 may also be relatively infrequent.

In the example of FIG. 4, employee "Smith" and employee "Miller" are assigned to node 8 of tree 334. For example, the data object z that is also assigned to node 8 may be the personnel record of employee "Smith."

LCA index 422 has a first status "current," indicating LCA index 422 is currently to be used for authorization checks. In addition, or alternatively, an LCA index 444 may be stored in shared memory 414. LCA index 444 has a second status "outdated" and a time stamp which indicates when the LCA index 444 transitioned from the first status "current" to its second status "outdated." LCA index 444 can be used for current authorization checks if LCA index 422 is not available and if LCA index 442 is not too old, e.g. if a predetermined first time interval from the time stamp has not lapsed.

Shared memory 414 may also include an instance 446 of a new LCA index yet to be computed. Instance 446 has a third status "waiting," which means the pre-computation of the new LCA index is delayed for a second time interval from the creation of the instance 446.

Shared memory 414 may also include an instance 448 for the pre-computation of a new LCA index. Instance 448 has a fourth status "in progress," which may indicate that the new LCA index is being pre-computed after the second time interval has lapsed.

Instructions 424 may include additional instructions 450 for performing an authorization check using an alternative method that does not require an LCA index. Instructions 450 may be executed if an authorization check needs to be performed at a time when neither a current LCA index nor an outdated LCA index for which the first time interval did not yet lapse is available.

Figure 5:
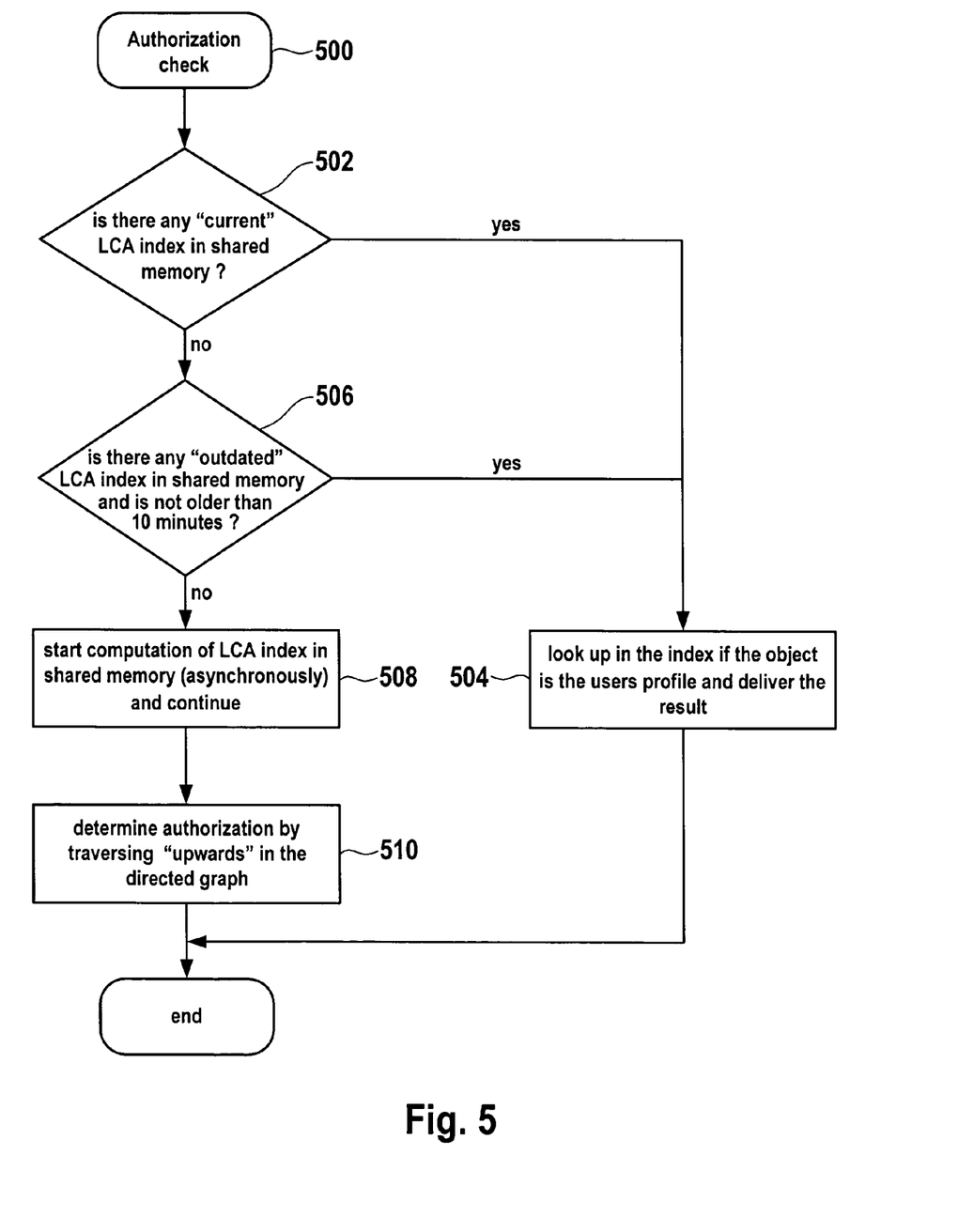
FIG. 5 illustrates, consistent with an embodiment of the invention, a flowchart of another exemplary method.

FIG. 5 illustrates, consistent with the invention, a flowchart of an exemplary method of status-dependent use of LCA indices 422 and 444 (FIG. 4). In step 500, an authorization check may be initiated upon receipt of access request 430 by application server 410. In step 502, a determination may be made whether an LCA index having the first status "current" is available in shared memory 414. In this example, LCA index 422 may be identified and used to perform the authorization check (step 504). Performance of the authorization check can be implemented in accordance with the steps 202 to 210 (FIG. 2).

If there is no LCA index 422 in shared memory 414, step 506 may be executed. There may not be an LCA index if, for example, a tree update had been entered into the database table 406 such that the current LCA index transitioned to outdated.

In step 506, a determination is made whether an LCA index having the second status is in shared memory 414 and, if so, whether the second time interval of that LCA index has already expired. In this example, LCA index 444 may be identified as outdated. If the LCA index 444 is available in the shared memory 414 and if the second time interval has not yet expired, control may proceed to step 504. In other words, the outdated LCA index 444 may be used to perform the authorization check because only a negligible amount of time has expired from its transition from the first to the second status. The second time interval may be configured depending on the particular application. For example, the second time interval can be between five to fifteen minutes, such as ten minutes.

If LCA index 444 does not exist or if the second time interval has lapsed, control may proceed to step 508. In step 508, a pre-computation of a new LCA index may be initiated. The pre-computation of the new LCA index may be performed asynchronously such that the subsequent step 510 can be carried out immediately after initialization of the pre-computation of the new LCA index (step 508).

In step 510, instructions 450 (FIG. 4) may be invoked to perform the authorization check without an LCA index. For example, the authorization check may be performed by upwards traversal of the directed graph, e.g., tree 334.

Figure 6:
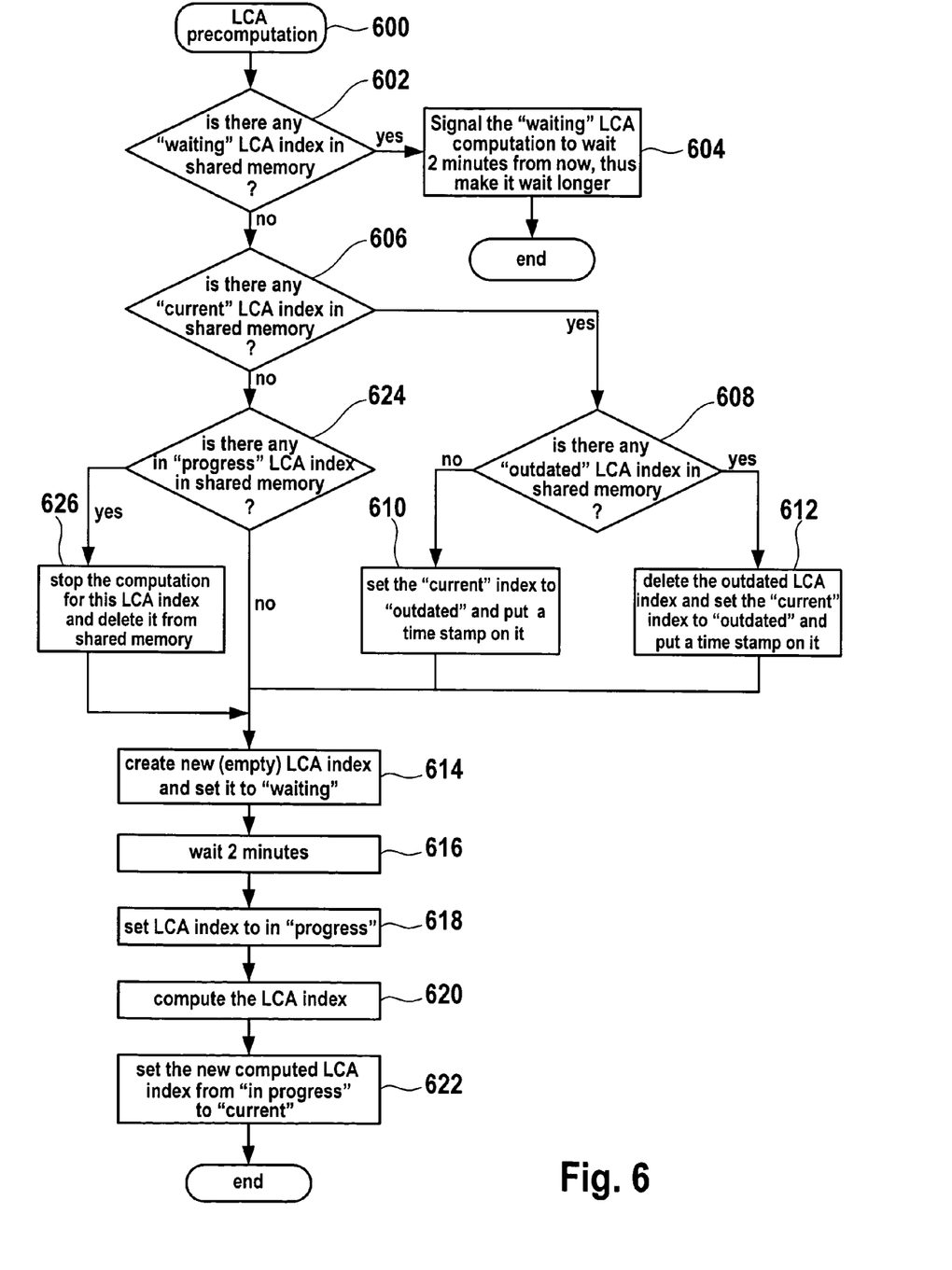
FIG. 6 illustrates, consistent with an embodiment of the invention, a flowchart of another exemplary method.

FIG. 6 illustrates a flowchart of an exemplary method of LCA index pre-computation. In step 600, program instructions 420 may be invoked due to the initialization of the LCA pre-computation in step 508 (FIG. 5). In step 602, a determination may be made whether an LCA index 446 exists in shared memory 414. If so, control may proceed to step 604.

In step 604, the second time interval may be incremented for a period of time that is shorter than the first time interval. For example, if the first time interval is ten minutes, the second time interval may be incremented by two minutes. Pre-computation of the new LCA index may be executed after the incremented second time interval has lapsed.

If there is no LCA index 446 (status "waiting") in shared memory 414, a determination may be made in step 606 whether there is an LCA index 422 (current) in shared memory 414. If an LCA index 422 (current) exists in shared memory 414 (step 606), control may proceed to step 608 where a determination may be made whether there is an LCA index 444 (outdated/timestamp) in shared memory 414.

If an LCA index 444 exists, LCA index 422 may transition from its first status to the second status and may be time stamped in order to become LCA index 444 (step 610). If, however, LCA index 444 exists in shared memory 414, LCA index 444 may be deleted and the status transition of the LCA index 422 may be executed from its first status to the second status such that the LCA index 422 replaces the former LCA index 444 (step 612). From steps 610 or 612, control may proceed to step 614 (described below).

Returning to step 606, if a determination is made that there is no LCA index 444 does not exists in shared memory 414, control may proceed to step 624. In step 624, a determination may be made whether there is an instance 448 (status "in progress") in shared memory 414. If such an instance 448 exists, control may proceed to step 626 where the ongoing pre-computation of the LCA index with respect to the existing instance 448 may be stopped and instance 448 may be deleted. Control may then proceed to step 614. If, however, step 624 determines that instance 448 does not exist in shared memory 414, control may proceed directly to step 614.

At step 614, the instance 446 for a new LCA index may be generated and the status set to "waiting". After the second time interval has lapsed (e.g., two minutes, step 616), LCA index 446 may transition to instance 448 (status "in progress," step 618) and the new LCA index may be computed in step 620. After completion of the new LCA index, instance 448 may transition to become the new LCA index 422 (status changed from "in progress" to "current," step 622).

Systems and methods consistent with the present invention, including those disclosed herein, may be embodied in various forms including, for example, a data processor, such as a computer that also includes a database, digital electronic circuitry, firmware, software, or in combinations thereof. Moreover, the above-noted features and other aspects and principles of the present invention may be implemented in various environments.

Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Embodiments of the invention may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the invention will be apparent to those skilled in the art from consideration of the specification and practice of the embodiments and features of the invention disclosed herein. It is intended, therefore, that the specification and embodiments be considered as exemplary only, with a true scope and spirit of the invention being indicated by the following claims.

What is claimed is:

1. A data processing system, comprising:
a memory device including a database for storing first data descriptive of at least one graph and for storing second data descriptive of an assignment of a user to a first node of the graph;
a server comprising:
memory for storing a pre-computed least common ancestor index of the graph, the pre-computed least common ancestor index being assigned a status; and
a processor for:
receiving an access request of the user, the access request specifying a second node of the graph, wherein the pre-computed least common ancestor index is computed before receiving the access request;
determining whether to use the pre-computed least common ancestor index to process the access request based on the status;
requesting computation of a new least common ancestor index when it is determined that the pre-computed least common ancestor index cannot be used;
determining a least common ancestor of the first and second nodes of the graph using the pre-computed or the new least common ancestor index depending on the determination based on the status;
performing an authorization check adapted to grant authorization for the access request if the least common ancestor of the first and second nodes is the first node, wherein the pre-computed least common ancestor index has a time stamp and the status is either a first status or a second status, the pre-computed least common ancestor index being used for determining the least common ancestor of the first and second nodes if it has the first status;
using an additional pre-computed least common ancestor index when the additional pre-computed least common ancestor index is available, when a status of the additional pre-computed least common ancestor index is not older than a predefined first time interval, and if the pre-computed least common ancestor index having the first status is not available; and
generating an instance of the new least common ancestor index for initialization when the additional pre-computed least common ancestor index is not available or is older than the predefined first time interval, wherein the least common ancestor of the first and second nodes is determined by an upwards traversal of the graph until the computation of the new least common ancestor index is completed.

2. The data processing system of claim 1, wherein the graph comprises nodes that represent organizational entities.

3. The data processing system claim 1, further comprising:
third data descriptive of an assignment of an individual to the second node of the graph, wherein the access request indicates the individual for specification of the second node.

4. The data processing system of claim 1, wherein the graph comprises a tree.

5. A method for performing an authorization check for a user, the user being assigned to a first node of a graph, the method being executed by a data processing system and comprising:
storing, in memory of the data processing system, a pre-computed least common ancestor index, the pre-computed least common ancestor index being assigned a status;
receiving an access request from the user, the access request specifying a second node of the graph, wherein the pre-computed least common ancestor index is computed before receiving the access request;
determining whether to use the pre-computed least common ancestor index to process the access request based on the status;
requesting computation of a new least common ancestor index when it is determined that the pre-computed least common ancestor index cannot be used;
determining a least common ancestor of the first and second nodes using the pre-computed or the new least common ancestor index depending on the determination based on the status;
granting authorization if the least common ancestor of the first and second nodes is the first node, wherein the pre-computed least common ancestor index has a time stamp and the status is either a first status or a second status, the pre-computed least common ancestor index being used for determining the least common ancestor of the first and second nodes if it has the first status;
using an additional pre-computed least common ancestor index when the additional pre-computed least common ancestor index is available, when a status of the additional pre-computed least common ancestor index is not older than a predefined first time interval, and if the pre-computed least common ancestor index having the first status is not available; and
generating an instance of the new least common ancestor index for initialization when the additional pre-computed least common ancestor index is not available or is older than the predefined first time interval, wherein the least common ancestor of the first and second nodes is determined by an upwards traversal of the graph until the computation of the new least common ancestor index is completed.

6. The method of claim 5, wherein the graph comprises nodes that represent organizational entities.

7. The method of claim 5, wherein:
the access request indicates one of a plurality of individuals, and
the method further comprises determining the second node using a predefined assignment of the one of the individuals to the second node.

8. The method of claim 5, wherein computing of the new least common ancestor index is initiated in response to the access request.

9. The method of claim 5, wherein the computing of the new least common ancestor index is initiated in response to entry of a modification of the graph into first data descriptive of the graph.

10. The method of claim 5, further comprising:
assigning a third status to the instance;
starting the computation after a predetermined second time interval from the generation of the instance; and
replacing the third status by a fourth status after the second time interval has lapsed.

11. The method of claim 10, wherein:
if the instance has been generated and if the instance has the third status, incrementing the second time interval in response to the request for computation of the new least common ancestor index,
else, if the pre-computed least common ancestor index having the first status is stored in shared memory, performing a status transition from the first status to the second status and time stamping the pre-computed least common ancestor index,
else, if the instance has been generated and if the instance has the fourth status, aborting the computation for the new least common ancestor index of the instance and deleting the instance from shared memory, and
else, generating a new instance for computation of the new least common ancestor index, the new instance having the third status, transitioning the status of the instance from the third status to the fourth status after the second time interval has lapsed and starting the computation of the new least common ancestor index, transitioning the fourth status after completion of the computation to the first status such that the instance becomes the new least common ancestor index having the first status.

12. The method of claim 5, wherein:
computation of the new least common ancestor index is initiated due to entry of a change of the graph,
an outdated pre-computed least common ancestor index is continued to be used for the determination of the least common ancestor of the first and second nodes during a first time interval,
an instance for computation of the new least common ancestor index is generated, and
computation of the new least common ancestor index is started after a second time interval has lapsed from the creation of the instance.

13. The method of claim 12, wherein entry of a subsequent entry of a change of the graph within the first time interval causes an increase of the second time interval.

14. A machine readable storage device comprising program code instructions which, when executed by a processor, perform a method for performing an authorization check for a user, the user being assigned to a first node of a graph, the method comprising:
storing a pre-computed least common ancestor index, the pre-computed least common ancestor index being assigned a status;
receiving an access request from the user, the access request specifying a second node of the graph, wherein the pre-computed least common ancestor index is computed before receiving the access request;
determining whether to use the pre-computed least common ancestor index to process the access request based on the status;
requesting computation of a new least common ancestor index when it is determined that the pre-computed least common ancestor index cannot be used;
determining a least common ancestor of the first and second nodes using the pre-computed or the new least common ancestor index depending on the determination based on the status;
granting authorization if the least common ancestor of the first and second nodes is the first node, wherein the pre-computed least common ancestor index has a time stamp and the status is either a first status or a second status, the pre-computed least common ancestor index being used for determining the least common ancestor of the first and second nodes if it has the first status;
using an additional pre-computed least common ancestor index when the additional pre-computed least common ancestor index is available, when a status of the additional pre-computed least common ancestor index is not older than a predefined first time interval, and if the pre-computed least common ancestor index having the first status is not available; and
generating an instance of the new least common ancestor index for initialization when the additional pre-computed least common ancestor index is not available or is older than the predefined first time interval, wherein the least common ancestor of the first and second nodes is determined by an upwards traversal of the graph until the computation of the new least common ancestor index is completed.

15. The machine readable storage device of claim 14, wherein the method further comprises computing the new least common ancestor index for determining the least common ancestor of the first and second nodes.

* * * * *